United States Patent
Okamoto et al.

(10) Patent No.: US 9,686,325 B2
(45) Date of Patent: Jun. 20, 2017

(54) CLIENT TERMINAL'S TETHERING FUNCTION IS SELECTIVELY TURN ON OR OFF BASED ON NETWORK CONNECTION

(71) Applicant: Panasonic Corporation, Kadoma-shi, Osaka (JP)

(72) Inventors: Ryuichi Okamoto, Osaka (JP); Masaki Mukai, Hyogo (JP); Tomoyuki Shimomura, Osaka (JP); Masaichi Yano, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 331 days.

(21) Appl. No.: 14/465,288

(22) Filed: Aug. 21, 2014

(65) Prior Publication Data
US 2015/0067177 A1  Mar. 5, 2015

(30) Foreign Application Priority Data

Sep. 2, 2013   (JP) .................................. 2013-181079
Jul. 14, 2014   (JP) .................................. 2014-143816

(51) Int. Cl.
*H04W 76/04*   (2009.01)
*H04L 29/06*   (2006.01)
(Continued)

(52) U.S. Cl.
CPC ......... *H04L 65/1069* (2013.01); *H04W 28/18* (2013.01); *H04W 36/0011* (2013.01);
(Continued)

(58) Field of Classification Search
CPC ... H04L 63/1416; H04L 65/1069; H04L 9/00; H04M 1/72527; H04M 15/58;
(Continued)

(56) References Cited

U.S. PATENT DOCUMENTS

2010/0267368 A1* 10/2010 Masputra .......... H04M 1/72527
                                                                   455/414.1
2012/0063327 A1   3/2012 Sakai
(Continued)

FOREIGN PATENT DOCUMENTS

JP    2007-150509    6/2007
JP    2010-268300    11/2010
(Continued)

*Primary Examiner* — Le H Luu
(74) *Attorney, Agent, or Firm* — Hamre, Schumann, Mueller & Larson, P.C.

(57) ABSTRACT

An information processing apparatus of the present disclosure includes: a processor; a network interface that establishes a connection to a network and a connection to a client terminal; and a storage unit, wherein the processor is capable of executing a tethering function to control communication between the network and the client terminal through the network interface, the storage unit stores network information of the network, to which the information processing apparatus connects, and ON/OFF information of the tethering function in association with the network information, and the processor sets the tethering function based on the ON/OFF information of the tethering function when the network interface connects to the network.

8 Claims, 6 Drawing Sheets

400

| Network information | Tethering function on/off information | SSID | Authentication/coding information | Communication system | Available communication capacity | Number of connectable terminal | Connectable terminal identification information |
|---|---|---|---|---|---|---|---|
| WLAN | Off | – | – | – | – | – | – |
| WWAN | On | 111 | Authentication method:A Coding method:AA Authentication information:AAA | System A | 3G Byte | Three | Not limited |
| WiMAX | On | 111 | Authentication method: A Coding method:AA Authentication information:AAA | System A | Not limited | Three | Not limited |
| Wired LAN | On | 222 | Authentication method:B Coding method:BB Authentication information:BBB | System B | 7G Byte | One | MAC address is 01:23:45:67:89:AB:CD:EF |

410  420  421  422  423  424  425  426

(51) Int. Cl.
*H04W 76/02* (2009.01)
*H04W 76/00* (2009.01)
*H04W 36/00* (2009.01)
*H04W 36/36* (2009.01)
*H04W 28/18* (2009.01)

(52) U.S. Cl.
CPC ........... *H04W 36/36* (2013.01); *H04W 76/00* (2013.01); *H04W 76/02* (2013.01); *H04W 76/025* (2013.01); *H04W 76/04* (2013.01)

(58) Field of Classification Search
CPC ....... H04W 12/08; H04W 28/08; H04W 4/06; H04W 48/18; H04W 76/021; H04W 76/041; H04W 76/00; H04W 76/02; H04W 76/025; H04W 76/04; H04W 28/18; H04W 36/36; H04W 36/0011
See application file for complete search history.

(56) References Cited

U.S. PATENT DOCUMENTS

| | | | |
|---|---|---|---|
| 2012/0240197 A1* | 9/2012 | Tran | H04L 63/1416 726/4 |
| 2013/0103819 A1* | 4/2013 | Meyer | H04L 9/00 709/223 |
| 2013/0107783 A1* | 5/2013 | Shaw | H04W 4/06 370/312 |
| 2013/0148568 A1 | 6/2013 | Iimori | |
| 2013/0171964 A1* | 7/2013 | Bhatia | H04W 12/08 455/411 |
| 2014/0068212 A1* | 3/2014 | Lin | H04M 15/58 711/162 |
| 2014/0181172 A1* | 6/2014 | Elliott | H04W 28/08 709/201 |
| 2015/0003432 A1* | 1/2015 | Tanaka | H04W 76/021 370/338 |
| 2015/0067177 A1* | 3/2015 | Okamoto | H04L 65/1069 709/227 |
| 2015/0117347 A1* | 4/2015 | Iwai | H04W 76/041 370/329 |
| 2015/0230165 A1* | 8/2015 | Aminaka | H04W 48/18 455/552.1 |

FOREIGN PATENT DOCUMENTS

| | | |
|---|---|---|
| JP | 2013-115543 | 6/2013 |
| JP | 2013-126046 | 6/2013 |
| WO | 2014/142299 | 9/2014 |

\* cited by examiner

| Network information 410 | Tethering function on/off information 420 | SSID 421 | Authentication/coding information 422 | Communication system 423 | Available communication capacity 424 | Number of connectable terminal 425 | Connectable terminal identification information 426 |
|---|---|---|---|---|---|---|---|
| WLAN | Off | — | — | — | — | — | — |
| WWAN | On | 111 | Authentication method:A Coding method:AA Authentication information:AAA | System A | 3G Byte | Three | Not limited |
| WiMAX | On | 111 | Authentication method: A Coding method:AA Authentication information:AAA | System A | Not limited | Three | Not limited |
| Wired LAN | On | 222 | Authentication method:B Coding method:BB Authentication information:BBB | System B | 7G Byte | One | MAC address is 01:23:45:67:89:AB:CD:EF |

FIG. 6

| Network information 610 | | Tethering function on/off information 420 | SSID 421 | Authentication/coding information 422 | Communication system 423 | Connectable terminal identification information 426 |
|---|---|---|---|---|---|---|
| Type | Network name | | | | | |
| Wired LAN | Office network | Off | — | — | — | — |
| Wired LAN | Home network | On | 222 | Authentication method:B Coding method:BB Authentication information:BBB | System B | MAC address is 01:23:45:67:89:AB:CD:EF |

600

CLIENT TERMINAL'S TETHERING FUNCTION IS SELECTIVELY TURN ON OR OFF BASED ON NETWORK CONNECTION

BACKGROUND OF THE INVENTION

1. Field of the Invention

The present disclosure relates to an information processing apparatus having a tethering function.

2. Description of the Related Art

PTL 1 discloses a communication apparatus for switching between an operation mode of a base station and an operation mode of a slave station in devices having both of a base station function and a slave station function.

CITATION LIST

Patent Literature

PTL 1: Unexamined Japanese Patent Publication No. 2010-268300

SUMMARY OF THE INVENTION

The present disclosure provides an information processing apparatus excellent in usability of a tethering function.

The information processing apparatus of the present disclosure includes: a processor; a network interface that establishes a connection to a network and a connection to a client terminal; and a storage unit. The processor is capable of executing a tethering function to control communication between the network and the client terminal through the network interface, the storage unit stores network information of the network, to which the information processing apparatus connects, and ON/OFF information of the tethering function in association with the network information, and the processor sets the tethering function based on the ON/OFF information of the tethering function when the network interface connects to the network.

The information processing apparatus in the present disclosure is excellent in usability of the tethering function.

DETAILED DESCRIPTION OF THE PREFERRED EMBODIMENT

Hereinafter, an embodiment will be described in detail with reference to the drawings as appropriate. However, a description more in detail than necessary is omitted in some case. For example, a detailed description of a well-known item and a duplicate description of the substantially same configuration are omitted in some case. These omissions are made in order to avoid unnecessary redundancy of the following description and to facilitate the understanding of those skilled in the art.

Note that the accompanying drawings and the following description are provided in order to allow those skilled in the art to fully understand this disclosure, and it is not intended to thereby limit the subject of the description of the scope of claims.

Exemplary Embodiment

An embodiment will be described with reference to FIGS. 1 to 5.

[1-1-1. Configuration of System]

Figure 1:
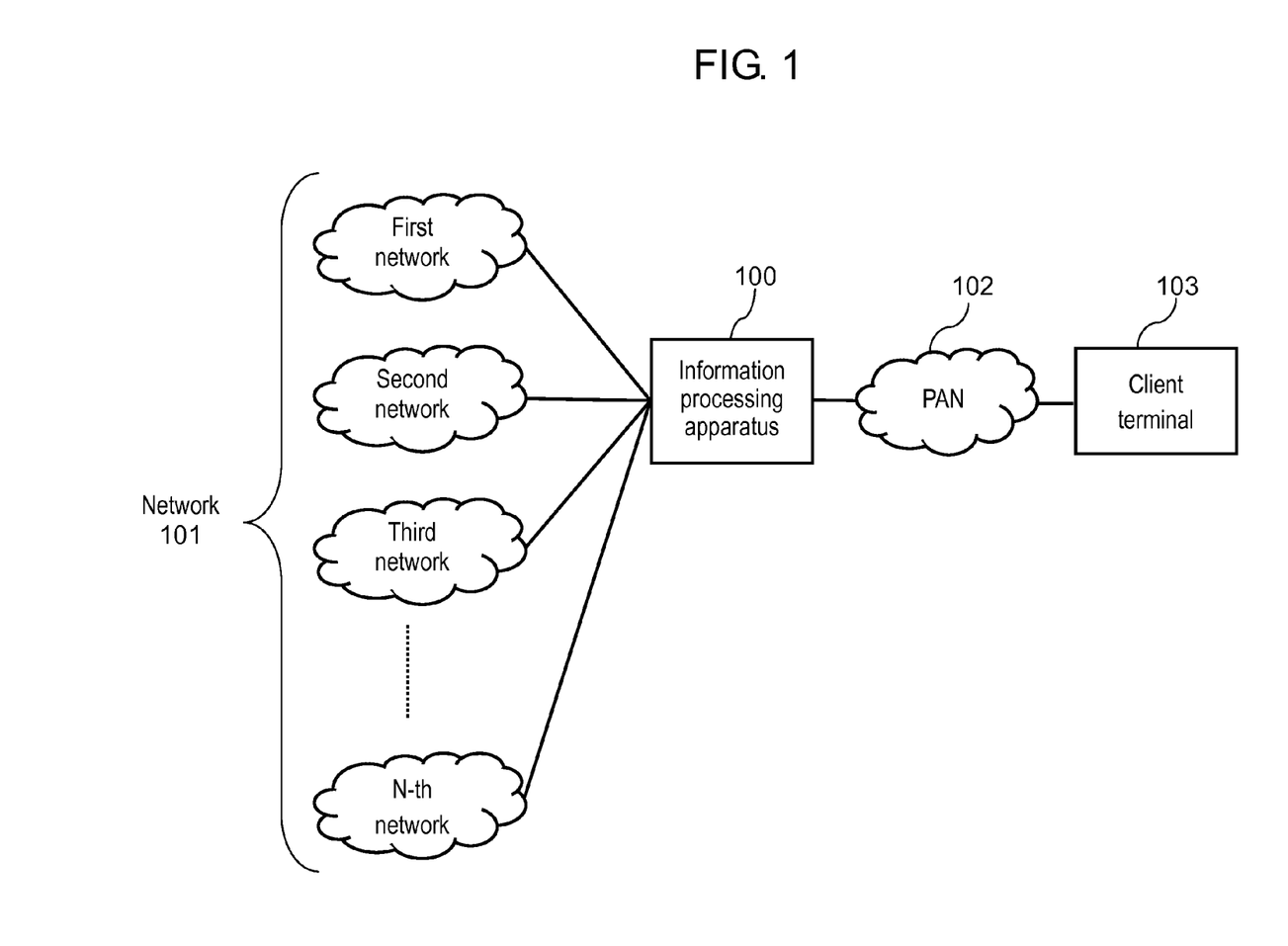
FIG. 1 is a view illustrating an environment where an information processing apparatus in an embodiment operates.

FIG. 1 is a view illustrating an environment where information processing apparatus 100 in the embodiment operates. In FIG. 1, the environment where information processing apparatus 100 operates includes: one or more networks included in network 101; PAN (Personal Area Network) 102; and client terminal 103.

Network 101 is a network to which information processing apparatus 100 is connectable, and for example, is a WWAN (Wireless Wide Area Network) that is a communication service for allowing information processing apparatus 100 and other devices to connect to a wide area data communication network formed by a wireless communication, a WLAN (Wireless Local Area Network/Wireless LAN) that is a local communication network for wirelessly transmitting and receiving data, a WiMAX (Worldwide Interoperability for Microwave Access) network that is one of the standards of the radio communication technology, a Wired LAN (Local Area Network) that is a local communication network for connecting devices to one another by communication cables such as copper fibers and optical fibers and for allowing the devices to communicate with one another by transmission/reception of electricity or light, or the like.

PAN 102 is a communication network with a terminal serving as a client, the communication network being formed by information processing apparatus 100 serving as a host. PAN 102 enables communication between information processing apparatus 100 and the terminal serving as a client. PAN 102 is formed in such a manner that the terminal serving as a client connects to information processing apparatus 100 in a case where information processing apparatus 100 turns on a tethering function.

Client terminal 103 is a terminal that connects to PAN 102.

Information processing apparatus 100 connects to network 101, and turns on the tethering function, whereby client terminal 103 connecting to information processing apparatus 100 can communicate with network 101 though PAN 102 and information processing apparatus 100.

[1-1-2. Configuration of Information Processing Apparatus]

Figure 2:
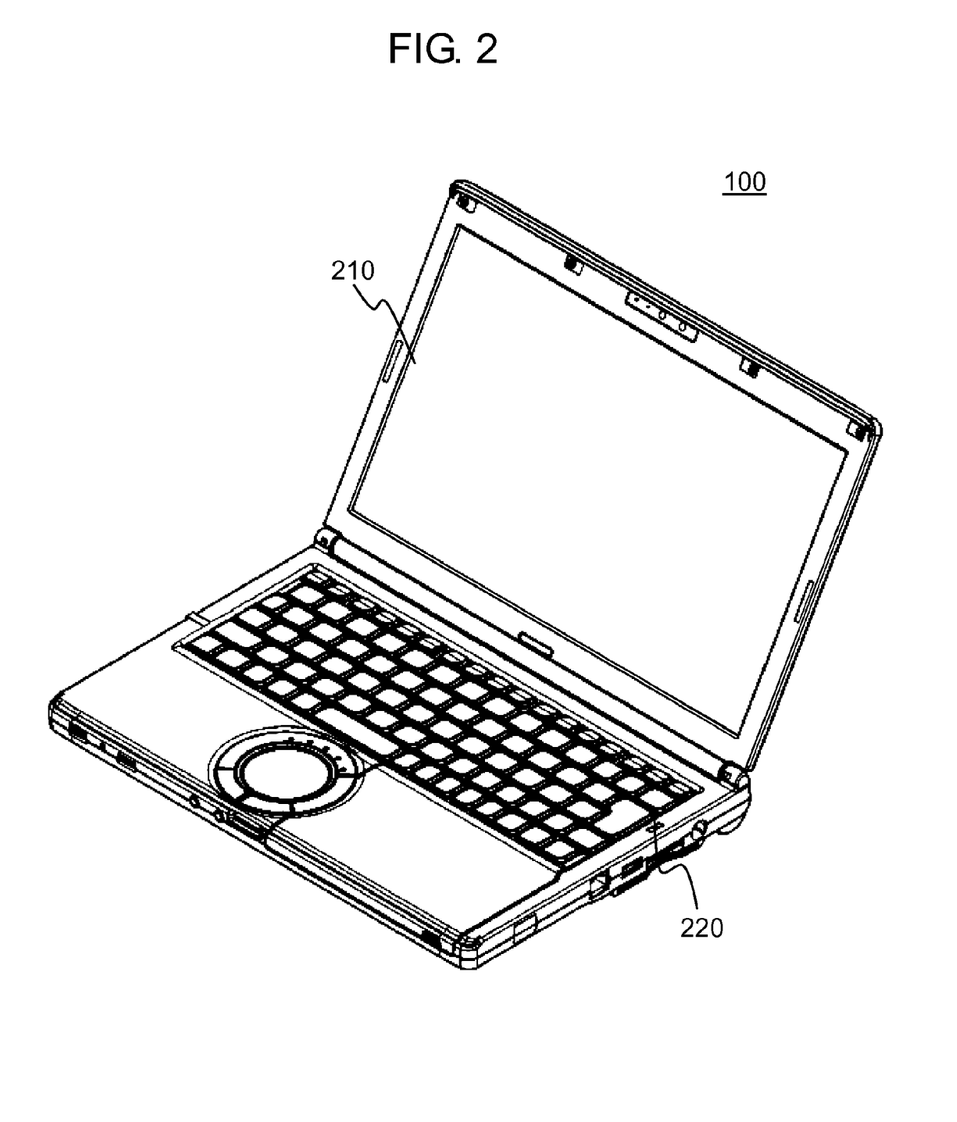
FIG. 2 is an exterior view of the information processing apparatus in the embodiment.

FIG. 2 is an exterior view of information processing apparatus 100 in the embodiment.

Information processing apparatus 100 performs predetermined information processing based on an OS (Operating System). This embodiment will be described by using a notebook computer as an example of information processing apparatus 100. Information processing apparatus 100 of this disclosure is not limited to the notebook computer. A laptop PC, a tablet PC, a smart phone or the like is applicable as information processing apparatus 100.

Output unit 210 displays an image and a video. Typically, a liquid crystal display is used as output unit 210.

Input unit 220 receives an input. Typically, a touch panel, a keyboard, a touch pad, buttons and the like are used as input unit 220.

Figure 3:
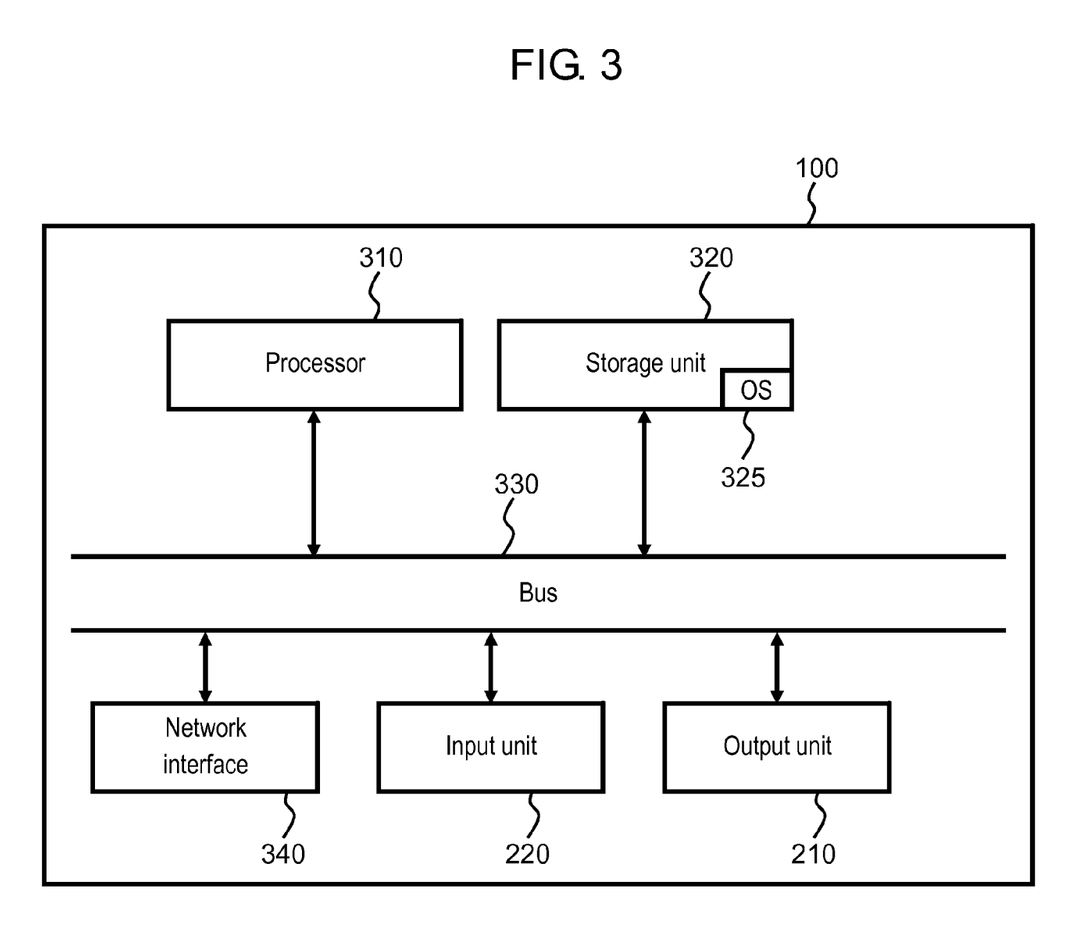
FIG. 3 is a block diagram of the information processing apparatus in the embodiment.

FIG. 3 is a block diagram of information processing apparatus 100 in the embodiment.

Processor 310 executes a program stored in storage unit 320. Processor 310 executes the program, and thereby controls other constituents of information processing apparatus 100. For example, processor 310 displays image information, which is stored in storage unit 320, on output unit 210.

Storage unit 320 temporarily or permanently stores data necessary for the processing of information processing apparatus 100. For example, storage unit 320 stores OS 325, the program, a database to be described later, and the like. A volatile memory, a non-volatile memory, an HDD (Hard Disk Drive) or the like is used as storage unit 320.

Bus 330 is a place through which electrical signals transmitted/received by the other constituents of information processing apparatus 100 pass. Through bus 330, a control signal and data are transmitted/received among the respective constituents of information processing apparatus 100.

Under control of processor 310, network interface 340 performs connection/disconnection with network 101, acquisition of information regarding network 101, connection of communication to client terminal 103, and ON or OFF of the tethering function. The tethering function is a function to connect client terminal 103 through PAN 102 to information processing apparatus 100, and to communicate with network 101 via information processing apparatus 100.

Note that network interface 340 may be a single interface, or in response to types of the respective networks, may be a plurality of interfaces, for example, such as a network interface for the WWAN, a network interface for the WLAN, a network interface for the WiMAX, and a network interface for the Wired LAN.

[1-1-3. Configuration of Database]

Figure 4:
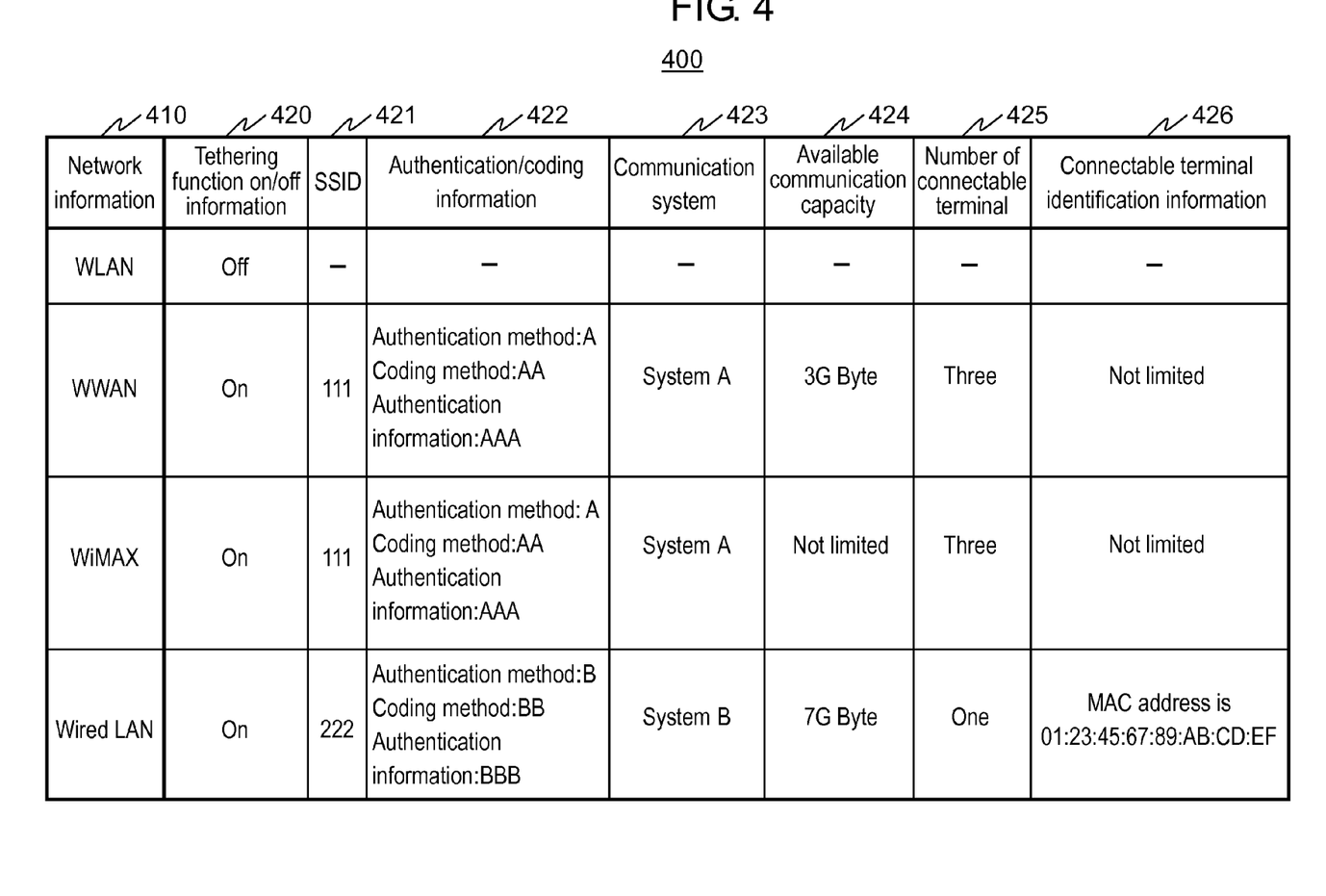
FIG. 4 is a table showing an example of a database stored in a storage unit of the information processing apparatus in the embodiment.

FIG. 4 is a table showing an example of a database stored in the storage unit of information processing apparatus 100 in the embodiment. Database 400 stores sets of information, each set of which is formed by network information 410, tethering function ON/OFF information 420, SSID (Service Set Identifier) 421, authentication/coding information 422, communication system 423, available communication capacity 424, number of connectable terminal 425 and connectable terminal identification information 426.

Network information 410 is the type of network 101 to which information processing apparatus 100 connects. For example, network information 410 is such a type as "WLAN", "WiMAX", "WWAN" and "Wired LAN".

Note that network information 410 is not limited to the above-descried types of the network. Network information 410 may include not only the type of the network but also an SSID that is an identifier of an access point of network 101, information for identifying a carrier that manages a network as a connection destination, and a network name. That is to say, network information 410 just may be information capable of specifying the connection destination.

Tethering function ON/OFF information 420 is information indicating whether the tethering function to connect client terminal 103 to information processing apparatus 100 is to be turned on or off in a case where information processing apparatus 100 connects to network 101 specified by network information 410.

SSID 421 is information indicating contents set as an SSID, which is an identifier of an access point of PAN 102, of information processing apparatus 100 in a case where the tethering function is turned on.

Authentication/coding information 422 is information indicating contents set as an authentication method, a coding method and authentication information in an event where client terminal 103 connects to information processing apparatus 100 in a case where the tethering function is turned on. As examples of the authentication method, there are WPA-PSK (Wi-Fi Protected Access Pre-Shared Key), WPA2-PSK (Wi-Fi Protected Access 2 Pre-Shared Key) and the like. As examples of the coding method, there are AES (Advanced Encryption Standard), TKIP (Temporal Key Integrity Protocol) and the like. As examples of the authentication information, there are a security key and the like.

Communication system 423 is information indicating a name of a communication system set as a communication system in the event where client terminal 103 connects to information processing apparatus 100 in the case where the tethering function of information processing apparatus 100 is turned on. As examples of communication system 423, there are IEEE 802.11a, IEEE 802.11g and the like.

Available communication capacity 424 is information indicating an amount of data communicable by client terminal 103 through PAN 102 in the case where the tethering function of information processing apparatus 100 is turned on. In the case where the tethering function of information processing apparatus 100 is turned on, processor 310 monitors an amount of the communication made by client terminal 103. Then, in a case where the amount of communication exceeds a value designated by available communication capacity 424, processor 310 performs predetermined processing, for example, such as disconnection of the connection to client terminal 103.

Number of connectable terminal 425 is information indicating the number of such client terminal 103 connectable to information processing apparatus 100 in the case where the tethering function of information processing apparatus 100 is turned on. In the case where the tethering function of information processing apparatus 100 is turned on, processor 310 monitors the number of client terminal 103 connected to information processing apparatus 100, and controls so that the number of client terminal 103 connected to information processing apparatus 100 cannot exceed the number designated by number of connectable terminal 425.

Connectable terminal identification information 426 is information for identifying each of client terminals 103, which is connectable to information processing apparatus 100, in the case where the tethering function of information processing apparatus 100 is turned on. In the case of turning on the tethering function of information processing apparatus 100, processor 310 permits only client terminal 103, which is specified by connectable terminal identification information 426, to connect to information processing apparatus 100.

Note that, in this embodiment, such information regarding the setting in the event where information processing apparatus 100 and client terminal 103 are connected to each other, the information as being represented by SSID 421, authentication/coding information 422, communication system 423, available communication capacity 424, number of connectable terminal 425 and connectable terminal identification information 426, is referred to as setting information.

In FIG. 4, a case where network information 410 is "WLAN" indicates that the tethering function of information processing apparatus 100 is "OFF". A case where network information 410 is "WWAN" indicates that the tethering function of information processing apparatus 100 is "ON", and that, in that case, the SSID of information processing apparatus 100 is "111", an authentication method thereof is "A", a coding method thereof is "AA", authentication information thereof is "AAA", a communication system thereof is "System A", an amount of data communicable by client terminal 103 that connects to information processing apparatus 100 is "3 Gigabytes", the number of client terminal 103 simultaneously connectable to information processing apparatus 100 is "three", and client terminals 103 thus connectable are "Not Limited". A case where network information 410 is "WiMAX" indicates that the tethering function of information processing apparatus 100 is "ON", and that, in that case, the SSID of information processing apparatus 100 is "111", an authentication method thereof is "A", a coding method thereof is "AA", authentication information thereof is "AAA", a communication system thereof is "System A", an amount of data communicable by client terminal 103 that connects to information processing apparatus 100 is "Not Limited", the number of client terminal 103 simultaneously connectable to information processing apparatus 100 is "three", and client terminals 103 thus connectable are "Not Limited". A case where network information 410 is "Wired LAN" indicates that the tethering function of information processing apparatus 100 is "ON", and that, in that case, the SSID of information processing apparatus 100 is "222", an authentication method thereof is "B", a coding method thereof is "BB", authentication information thereof is "BBB", a communication system thereof is "System B", an amount of data communicable by client terminal 103 that connects to information processing apparatus 100 is "7 Gigabytes", the number of client terminal 103 simultaneously connectable to information processing apparatus 100 is "one", and client terminal 103 thus connectable is only a terminal in which a MAC (Media Access Control) address is "01:23:45:67:89:AB:CD:EF".

[1-2. Operation]

An operation of information processing apparatus 100 configured as described above will be described.

Figure 5:
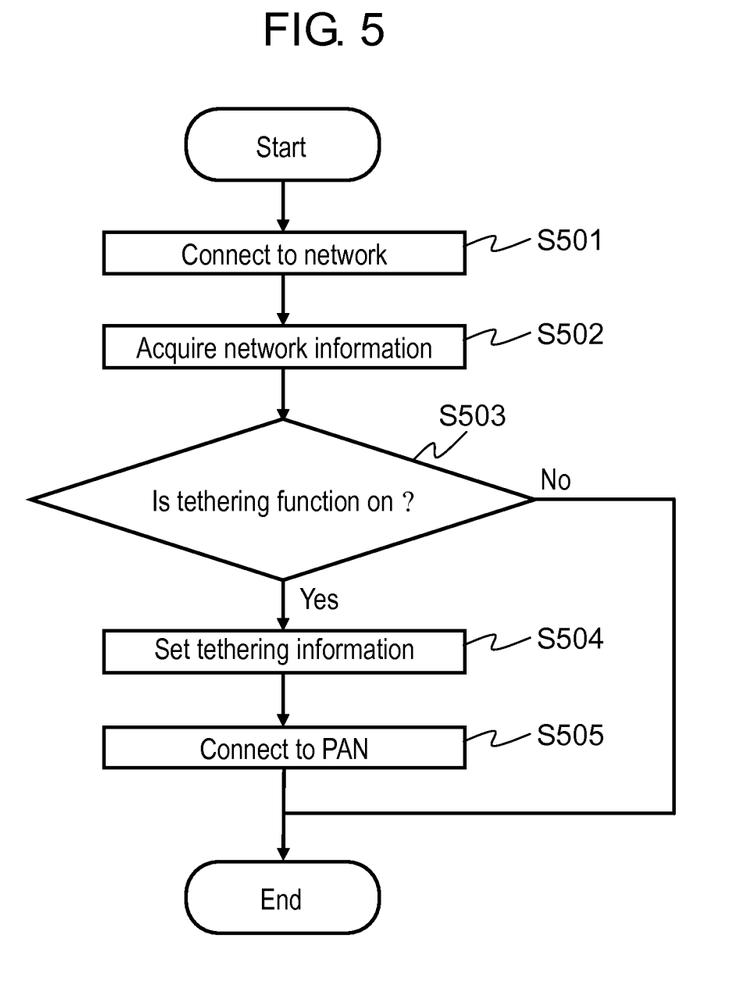
FIG. 5 is a flowchart illustrating processing for setting a tethering function in the embodiment.

FIG. 5 is a flowchart illustrating processing for setting the tethering function in the embodiment.

(Step S501) In accordance with a connection instruction to network 101, which is received by input unit 220, and with a predetermined rule set in advance, processor 310 controls network interface 340, and connects information processing apparatus 100 to network 101.

(Step S502) Processor 310 acquires network information 410 regarding network 101 to which information processing apparatus 100 connects. Network information 410 is managed by OS 325. Processor 310 acquires network information 410 corresponding to network 101, to which information processing apparatus 100 connects, from OS 325, and records network information 410 in storage unit 320. For example, it is assumed that network 101 to which information processing apparatus 100 connects in Step S501 is the WiMAX. In this case, network information 410 becomes "WiMAX".

(Step S503) With reference to database 400 stored in storage unit 320, processor 310 confirms whether tethering function ON/OFF information 420 stored so as to make a set with network information 410 recorded in storage unit 320 in Step S502 is "ON" or "OFF". In a case where tethering function ON/OFF information 420 is "ON" (case of Yes), processor 310 proceeds to processing of Step S504. In a case where tethering function ON/OFF information 420 is "OFF" (case of No), processor 310 ends the processing. Since network information 410 recorded in storage unit 320 in Step S502 is "WiMAX", tethering function ON/OFF information 420 is "ON", and accordingly, processor 310 proceeds to the processing of Step S504.

(Step S504) With reference to database 400 stored in storage unit 320, processor 310 refers to SSID 421, authentication/coding information 422, communication system 423, available communication capacity 424, number of connectable terminal 425 and connectable terminal identification information 426, which are stored so as to make a set with network information 410 recorded in storage unit 320 in Step S502. In accordance with the contents designated by the information thus referred to, processor 310 controls network interface 340 to set the tethering function. Since network information 410 recorded in storage unit 320 in Step S502 is "WiMAX", processor 310 controls network interface 340 to set the SSID of information processing apparatus 100 at "111", to set the authentication method thereof at "A", to set the coding method thereof at "AA", to set the authentication information thereof at "AAA", and to set the communication system thereof at "System A". Moreover, processor 310 controls so that the amount of data communicable by client terminal 103 that connects to information processing apparatus 100 can be "Not Limited", so that the number of client terminal 103 simultaneously connectable to information processing apparatus 100 can be "three", and so that MAC addresses of client terminals 103 thus connectable can be "Not Limited".

(Step S505) Processor 310 controls network interface 340 to turn on the tethering function, and to allow information processing apparatus 100 to be communicable with PAN 102.

Note that, when information processing apparatus 100 ends the connection to network 101, the tethering function is also ended.

[1-3. Effects and the Like]

As described above, in this embodiment, information processing apparatus 100 includes: processor 310; network interface 340 that establishes the connection to network 101 and the connection to client terminal 103; and storage unit 320. Processor 310 is capable of executing the tethering function to control the communication between network 101 and client terminal 103 through network interface 340. Storage unit 320 stores the network information of the network, to which information processing apparatus 100 connects, and the ON/OFF information of the tethering function in association with the network information. When network interface 340 connects to network 101, processor 310 sets the tethering function based on the ON/OFF information of the tethering function.

In this way, information processing apparatus 100 is capable of automatically setting the ON/OFF of the tethering function in response to network 101 as the connection destination. Information processing apparatus 100 sets in advance the ON/OFF of the tethering function for the network to which information processing apparatus 100 connects, and can thereby automatically connect to PAN 102 in response to the circumstances. Accordingly, it is not necessary for a user to pay attention to whether or not it is necessary to connect to PAN 102. Hence, information processing apparatus 100, which is excellent in usability of the tethering function, can be provided.

Moreover, in this embodiment, storage unit 320 stores the setting information for establishing the connection to client terminal 103 and the network information in association with the network information. When network interface 340 connects to the network, processor 310 sets the tethering function based on the ON/OFF information of the tethering function and the setting information.

In this way, client terminal 103 can be connected to information processing apparatus 100 under such a condition where predetermined setting is implemented for information processing apparatus 100.

Moreover, in this embodiment, the setting information includes the SSID of information processing apparatus 100. In this way, input of SSID 421 can be omitted at a time of connecting client terminal 103 to information processing apparatus 100. As a result, convenience for the user can be enhanced.

Furthermore, in this embodiment, the setting information includes the information of the coding method used in the authentication of the connection to client terminal 103. In this way, input of the authentication/coding information 422 can be omitted at the time of connecting client terminal 103 to information processing apparatus 100, and it becomes possible to set strength of security in advance.

Moreover, in this embodiment, the setting information includes the information of the communication system used in the connection to client terminal 103. In this way, input of communication system 423 can be omitted at the time of connecting client terminal 103 to information processing apparatus 100. For example, in an event where information processing apparatus 100 connects to network 101 through the WLAN, client terminal 103 can be connected to information processing apparatus 100 by using a communication system having less interference with the WLAN.

Furthermore, in this embodiment, the setting information includes the information regarding the amount of communication during the time when information processing apparatus 100 connects to client terminal 103. Processor 310 performs the predetermined processing in the case where the amount of communication with client terminal 103 exceeds a predetermined amount. In this way, for example, in an event where information processing apparatus 100 connects to network 101 such as the WWAN where a communication fee is varied depending on the amount of communication, it becomes possible to give warning and the like in a case where the amount of communication exceeds the predetermined amount.

Moreover, in this embodiment, the setting information includes the information regarding the number of client terminal 103 simultaneously connectable to information processing apparatus 100. In this way, for a line such as a public network where a communication speed is slow, available communication capacity 424 can be set in information processing apparatus 100 so that a communication speed per client terminal 103 cannot be decreased extremely.

Furthermore, in this embodiment, the setting information includes the identification information of client terminal 103 connectable to information processing apparatus 100. In this way, only permitted client terminal 103 can connect, for example, to predetermined network 101 through information processing apparatus 100.

Figure 6:
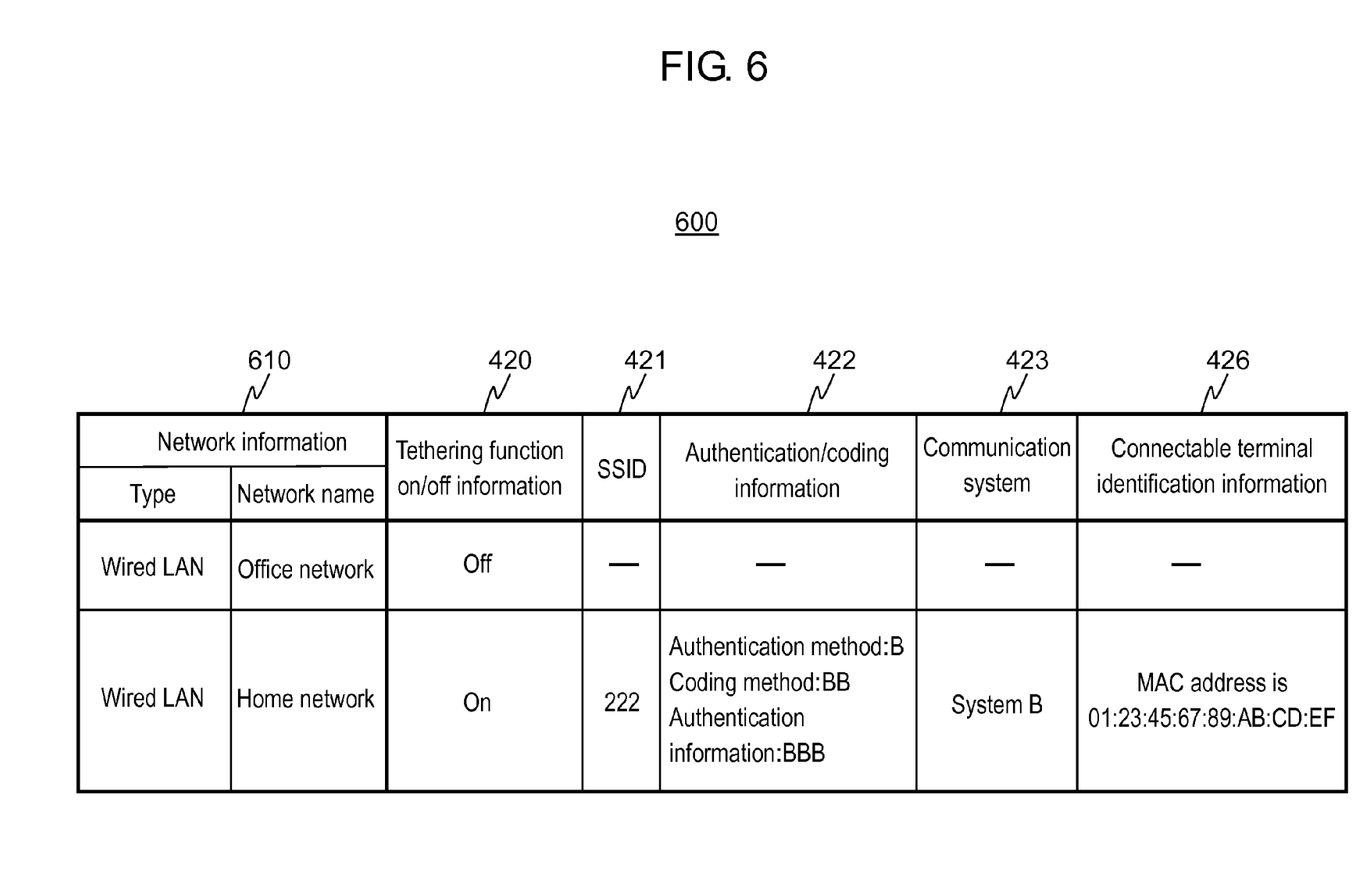
FIG. 6 is a table showing another example of the database stored in the storage unit of the information processing apparatus in the embodiment.

Note that the database stored in storage unit 320 is not limited to database 400 mentioned above. FIG. 6 is a table showing another example of the database stored in the storage unit of the information processing apparatus in the embodiment. To database 600, as network information 610, names of the networks are added in addition to the types thereof. Each name of the networks is information for enabling the tethering function to be switched on and off depending on an environment where information processing apparatus 100 connects to network 101 even if the types of the networks in network information 610 are the same. In FIG. 6, when the type of network information 610 is "Wired LAN", tethering function ON/OFF information 420 is settable to be "OFF" in a case where the name of the network is "Office network", and tethering function ON/OFF information 420 is settable to be "ON" in a case where the name of the network is "Home network". In this way, even if the type of the network in network information 610 is "Wired LAN", the tethering function is settable in response to the name of the network.

What is claimed is:

1. An information processing apparatus, comprising:
a processor;
a network interface that establishes a connection to either a first network or a second network, and the network interface also establishes a connection to a client terminal; and
a storage unit,
wherein the processor is capable of executing a tethering function to control communication between the first network and the client terminal through the network interface,
the storage unit stores network information of the first network and the second network, to which the information processing apparatus connects, and ON/OFF information of the tethering function in association with the network information,
the processor turns on the tethering function based on the ON/OFF information of the tethering function when the network interface connects to the first network, and
the processor turns off the tethering function based on the ON/OFF information of the tethering function when the network interface connects to the second network.

2. The information processing apparatus according to claim 1,
wherein the storage unit also stores setting information for establishing the connection to the client terminal in association with the first network information or the second network information, and
the processor turns on or off the tethering function based on the ON/OFF information of the tethering function and the setting information when the network interface connects to the first network or the second network.

3. The information processing apparatus according to claim 2,
wherein the setting information includes an SSID of the information processing apparatus.

4. The information processing apparatus according to claim 2,
wherein the setting information includes information of a coding method used in authentication of the connection to the client terminal.

5. The information processing apparatus according to claim 2,
wherein the setting information includes information of a communication system used in the connection to the client terminal.

6. The information processing apparatus according to claim 2,
wherein the setting information includes information regarding an amount of communication during a time when the information processing apparatus connects to the client terminal, and
the processor performs predetermined processing in a case where the amount of communication with the client terminal exceeds a predetermined amount.

7. The information processing apparatus according to claim 2,
wherein the setting information includes information regarding a number of the client terminal simultaneously connectable to the information processing apparatus.

8. The information processing apparatus according to claim 2,
wherein the setting information includes identification information of the client terminal connectable to the information processing apparatus.

* * * * *